Jan. 22, 1963  W. J. JASIONOWSKI  3,074,863
PROCESSES OF AND APPARATUS FOR TREATING IONIC LIQUIDS
Filed May 1, 1958  2 Sheets-Sheet 1

INVENTOR.
Walter J. Jasionowski
BY
Smith, Prangley, Baird & Clayton
Attys.

Jan. 22, 1963   W. J. JASIONOWSKI   3,074,863
PROCESSES OF AND APPARATUS FOR TREATING IONIC LIQUIDS
Filed May 1, 1958   2 Sheets-Sheet 2

INVENTOR.
Walter J. Jasionowski
BY
Smith, Brangley, Baird & Clayton
Attys.

United States Patent Office 3,074,863
Patented Jan. 22, 1963

3,074,863
PROCESSES OF AND APPARATUS FOR TREATING IONIC LIQUIDS
Walter J. Jasionowski, Chicago, Ill., assignor to General Electric Company, a corporation of New York
Filed May 1, 1958, Ser. No. 732,322
15 Claims. (Cl. 204—151)

The present invention relates to processes of and apparatus for treating ionic liquids, and more particularly to such processes and apparatus as applied to the demineralization of raw water containing dissolved metal salts.

In the copending application of Dominic J. Vallino, Serial No. 425,397, filed April 26, 1954, now abandoned, there is disclosed a process of and apparatus for demineralizing raw water containing dissolved metal salts that involves an electrolytic cell comprising an inner compartment containing a mixed bed of cation exchange resin and anion exchange resin and separated from bodies of catholyte and anolyte by ion permeable membranes. In the arrangement, the raw water is passed through the inner compartment into contact with the resin bed and also into contact with the membranes, and there is maintained across the resin bed an electrical potential causing displacement of sorbed cations and anions therefrom respectively into the bodies of catholyte and anolyte to effect regeneration of the resin bed. In the cell, the cation exchange resin is of bead-like formation and comprises the strong-acid resin "Amberlite IR-120," while the anion exchange resin is of bead-like formation and comprises the strong-base resin "Amberlite IRA-410."

In the operation of this apparatus, draw-offs of treated water are made periodically, while the resin bed is subjected to the regeneration continuously. Accordingly, during a draw-off of treated water from the apparatus, the resin bed is partially depleted or exhausted by the raw water supplied thereto; and in the interim between draw-offs of treated water from the apparatus, the resin bed is regenerated and restored to at least a partial state of regeneration in preparation for the next draw-off of treated water therefrom; whereby under normal operation of the apparatus, the resin bed is maintained between reasonable limits of states of regeneration.

However, it appears to be an inherent operating characteristic of the apparatus that the cation exchange resin is much more easily regenerated than is the anion exchange resin, so that the state of charge of the cation exchange resin is always higher than the state of charge of the anion exchange resin; and this inherent operating characteristic is encountered throughout any practical range of proportionment of the two resins in the mixed resin bed.

Accordingly, when a draw-off of treated water is made from the apparatus, the cation exchange resin is more effective than is the anion exchange resin, with the result that the cations of the dissolved metal salts in the raw water are preferentially removed or extracted with respect to the anions of the dissolved metal salts in the raw water; whereby the cation exchanges involving H+ are in excess of the anion exchanges involving OH−, with the result that the pH of the treated water is substantially reduced with respect to that of the raw water. Specifically, the treated waer from this apparatus has a pH in the normal range 4 to 6.

In many applications, the highly demineralized acidic solution that is produced by this apparatus is most advantageous; however, in other applications, such for example, as drinking water, the acidic character of the solution is altogether objectionable.

Accordingly, it is a general object of the present invention to provide a process of and apparatus for demineralizing raw water containing dissolved metal salts that is productive of a highly demineralized solution having a pH that is substantially increased with respect to that of the raw water.

The present invention is predicated upon the discovery that when an electrolytic cell of the character of that described above is provided with a bed of ion retardation resin in the inner compartment thereof, the inherent operating characteristic with respect to the pH of the treated solution is substantially the reverse of that described above; whereby the treated solution has a pH in the normal range 8 to 11. More particularly, in the operation of this improved apparatus, the raw water is highly demineralized by cation exchange and anion exchange by the ion retardation resin bed; however, in the re-charging time intervals between treated water draw-offs from the apparatus, the anion exchange centers are preferentially regenerated with respect to the cation exchange centers, with the result that it is the anion exchange centers that are maintained at a higher state of charge with respect to that of the cation exchange centers. Accordingly, in the improved apparatus, the anion exchange centers are more effective than are the cation exchange centers, with the result that while the raw water is highly demineralized, the resulting treated solution has a pH that is substantially increased with respect to that of the raw water.

Accordingly, it is another object of the invention to provide composite water demineralizing apparatus, including a first electrolytic cell provided in the inner compartment thereof with a mixed bed of cation exchange resin and anion exchange resin, and a second electrolytic cell provided in the inner compartment thereof with a bed of ion retardation resin, so that by proper utilization and proportionment of the two treated solutions, a resulting solution can be produced that is highly demineralized and which has a pH substantially in the neutrality range.

A further object of the invention is to provide an improved process of deionizing an ionic liquid in order to produce a treated solution having the desired and required pH thereof.

Another object of the invention is to provide improved apparatus for deionizing an ionic liquid in order to produce a treated solution having the desired and required pH thereof.

A still further object of the invention is to provide an improved process of an apparatus for effecting a controlled deionization of an ionic liquid, together with the production of a treated solution having a controlled pH.

Further features of the invention pertain to the particular arrangement of the steps of the process and of the elements of the apparatus; whereby the above-outlined and additional operating features thereof are attained.

The invention, both as to its organization and method of operation, together with further objects and advantages thereof, will be best understood by reference to the following specification, taken in connection with the accompanying drawings, in which.

Figure 1:
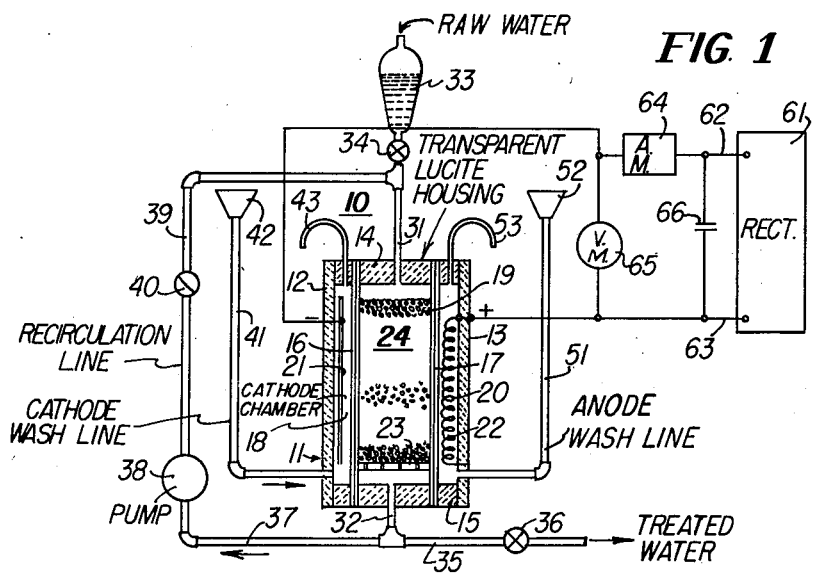
FIGURE 1 is a diagrammatic illustration of apparatus embodying the present invention and that may be employed in carrying out the process of the present invention.

Referring now to FIG. 1 of the drawings, there is illustrated apparatus 10 embodying the features of the present invention and including an electrolytic cell 11 of upstanding substantially box-like form provided with a first pair of opposed upstanding walls 12 and 13, a second pair of opposed upstanding walls, not shown, and a pair of end walls 14 and 15, all of the walls noted being formed of a suitable insulating material, such as methylmethacrylate resin. The interior of the cell 11 is divided by two membranes 16 and 17 into three compartments or chambers 18, 19 and 20; the center or inner chamber 19 comprising a treatment chamber, the left-hand chamber 18 comprising a cathode chamber, and the right-hand chamber 20 comprising an anode chamber. The membranes 16 and 17 may be identical, each comprising a suitable plywood sheet of poplar. In the cathode chamber 18, a cathode 21 is arranged; and in the anode chamber 20, an anode 22 is arranged.

The end walls 14 and 15 are respectively arranged at the top and at the bottom of the cell 11; a suitable insulating screen 23 is arranged in the treatment chamber 19 adjacent to the bottom end wall 15; and a porous bed 24 of ion retardation resin is arranged in the treatment chamber 19 and supported upon the insulating screen 23, the ion retardation resin being characterized by both cation exchange and anion exchange. Preferably, this ion retardation resin is that sold under the designation "Retardion 11A8"; which resin is of about 50–100 mesh and of substantially bead-like formation. Specifically, the resin is prepared by polymerizing an anionic monomer inside the pores of an anion exchange resin; whereby the linear polymer is trapped inside the cross-linked ion exchange resin and cannot diffuse out. The resin system is physically and chemically stable, and provides both cation exchange centers and anion exchange centers at the molecular level. Specifically, in this resin, acrylic acid is polymerized inside of the anion exchange resin "Dowex 1," which anion exchange resin essentially comprises a stable insoluble synthetic organic polymer and active basic functional groups chemically bonded thereto and dissociable into free mobile anions to impart positive charge to the polymer. Typical of such suitable polymers comprise urea-formaldehyde resins, melamine-formaldehyde resins, etc.; and typical such suitable basic functional groups include quaternary ammonium hydroxides, amino groups, the guanidyl group, etc.

Further, a water inlet conduit 31 communicates with the top of the treatment chamber 19 immediately above the resin bed 24 through the top end wall 14, and a water outlet conduit 32 communicates with the bottom of the treatment chamber 19 below the insulating screen 23 through the bottom end wall 15. The inlet conduit 31 is connected to a raw water reservoir 33 via a manually operable valve 34; and the outlet conduit 32 is connected to a treated water supply conduit 35 via a manually operable valve 36. Also the outlet conduit 32 is connected to the inlet conduit 31 for recirculation of the water through the treatment chamber 19 by an arrangement including a conduit 37 extending from the water inlet conduit 32 to a pump 38 and a conduit 39 extending from the pump 38 to the inlet conduit 31; and in the conduit 39, there is arranged a check valve 40 to prevent backflow of the water toward the pump 38.

Catholyte is supplied to the cathode chamber 18 by an arrangement including an upstanding conduit 41 communicating with the lower end of the cathode chamber 18; which conduit 41 is provided with a funnel 42 at the upper end thereof and is adapted to receive ordinary raw water as the catholyte. The catholyte is flushed from the upper end of the cathode chamber 18 through a communicating upstanding substantially inverted J-shaped conduit 43 extending to the exterior. Similarly, anolyte is supplied to the anode chamber 20 by an arrangement including an upstanding conduit 51 communicating with the lower end of the anode chamber 20; which conduit 51 is provided with a funnel 52 at the upper end thereof and is adapted to receive ordinary raw water as the anolyte. The anolyte is flushed from the upper end of the anode chamber 20 through a communicating upstanding substantially inverted J-shaped conduit 53 extending to the exterior.

A source of power supply for the cell 11 is provided that includes a rectifier 61 provided with a negative bus 62 and a positive bus 63. The negative bus 62 is connected directly to the cathode 21 and the positive bus is connected directly to the anode 22. An ammeter 64 is arranged in the negative bus 62 in order that the direct current conducted through the cell 11 may be metered; and a voltmeter 65 is arranged between the busses 62 and 63 in order that the direct voltage impressed therebetween and thus between the cathode 21 and the anode 22 may be metered. Finally a filtering condenser 66 is connected directly between the busses 62 and 63 in order to eliminate any ripple from the output voltage of the rectifier 61.

As a constructional example of the cell 11, the treatment chamber 19 may have the approximate dimensions 3½" x 4" x 9½", the dimension between the facing sides of the membranes 16 and 17 being 3½" and the dimension between the facing sides of the end walls 14 and 15 being 9½"; while each of the membranes 16 and 17 may have a thickness of about $\frac{1}{16}$". The cathode 21 comprises a stainless steel plate $\frac{1}{32}$" x 4" x 12"; and the anode 22 comprises a suitable length of $\frac{1}{32}$" diameter platinum clad tungsten wire. Finally, each of the chambers 18 and 20 has a volume of about 750 to 800 ml.

In a series of water demineralizing tests, Chicago city tap water was employed in the apparatus 10; which raw water has a specific resistance of 4000 to 4500 ohms/cm.³; a pH in the range 7.9 to 8.2; a soap hardness calculated as equivalent $CaCO_3$ in the range 120 to 130 p.p.m.; a total dissolved solids content of about 150 p.p.m.; and a $Cl^-$ content of about 9.5 p.p.m.

The test was initiated on November 27, but no draw-offs of treated water were made until December 2; and on December 2, 3, 4, 5 and 6, draw-offs were made each day at about 8:45 a.m., noon and 4:00 p.m. Also each day, each of the chambers 18 and 20 was flushed with about 500 to 800 ml. of this raw water at about 9:00 a.m. and again at about 4:30 p.m.

Figure 2:
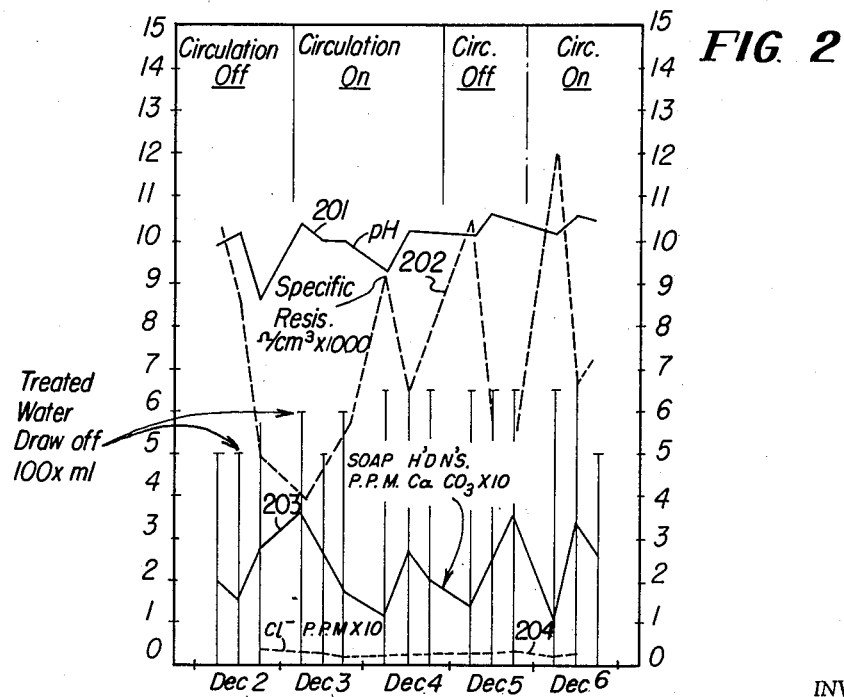
FIGS. 2 and 3 are graphic illustrations of certain performance characteristics of the apparatus of FIG. 1.

The results of this series of tests are graphically illustrated in FIG. 2; and therein, it will be observed that the draw-offs of treated water were in the range 500 to 650 ml. During the test, an operating voltage of 90 volts D.C. was impressed between the anode 22 and the cathode 21, and the operating current was in the range 80 to 320 ma. Moreover, as illustrated, the pump 38 was operated only a portion of the time; and it was discovered that the circulation of the treated water from the outlet conduit 32 back to the inlet conduit 31 improves the demineralization of the raw water.

In FIG. 2: the pH of the treated water was in the range 8.5 to 10.7, as illustrated by the curve 201; the specific resistance of the treated water was in the range 4,000 to 12,000 ohms/cm.³, as illustrated by the curve 202; the soap hardness of the treated water, calculated as equivalent $CaCO_3$, was in the range 10 to 40 p.p.m., as illustrated by the curve 203; and the $Cl^-$ content of the treated water was in the range 3 to 5 p.p.m., as illustrated by the curve 204.

Figure 3:
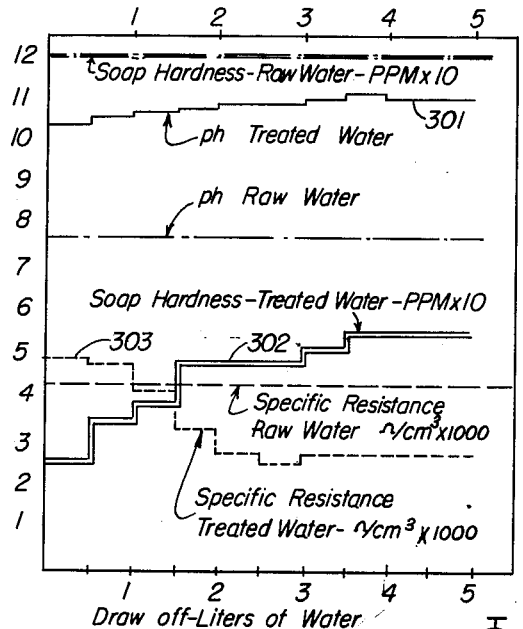

Following the series of tests that were concluded on December 6, the power was turned off and 5 liters of the Chicago tap water was passed through the treatment compartment 19 of the cell 11, and aliquots of this treated water in the outlet conduit 32 were taken. It was determined that the pH of these aliquots of treated water was in the range 10.5 to 11.2, as illustrated by the curve 301 in FIG. 3; that the soap hardness of these aliquots of treated water was in the range 26 to 57 p.p.m., calculated as $CaCO_3$, as illustrated by the curve 302 in FIG. 3; and that the specific resistance of these aliquots of treated water was in the range 2,600 to 5,000 ohms/cm.³, as illustrated by the curve 303 in FIG. 3. Also, from the soap hardness tests, it was estimated that the demineralization of the Chicago tap water was approximately 66%.

Now in comparable tests employing the apparatus 10 and utilizing in the treatment chamber 19 thereof, a mixed bed of cation exchange resin ("Amberlite IR–120") and anion exchange resin ("Amberlite IRA–410"), it has been established that the treated water at the outlet conduit 32, while highly demineralized, has a pH normally in the range 4 to 6 by virtue of the fact that the cations of the dissolved metal salts are preferentially removed with respect to the anions of the dissolved metal salts.

Figure 4:
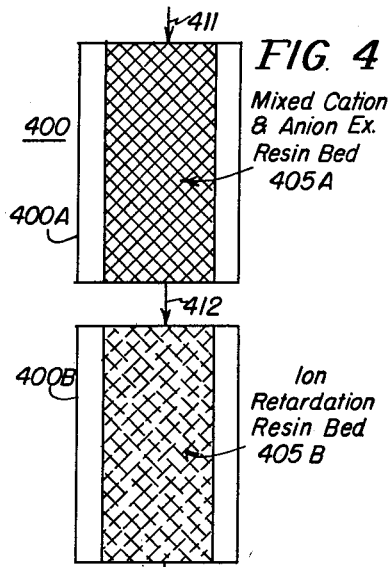
FIG. 4 is a schematic illustration of a water demineralizing system incorporating the apparatus of FIG. 1.

Referring now to FIG. 4, there is diagrammatically illustrated one form of a water demineralizing system 400 that comprises two tandem related electrolytic cells 400A and 400B that may be of the fundamental construction of that disclosed in FIG. 1. In the arrangement, the treatment chamber of the cell 400A comprises a mixed bed 405A of cation exchange resin ("Amberlite IR–120") and anion exchange resin ("Amberlite IRA–410"), while the treatment chamber of the cell 400B comprises a bed 405B of ion retardation resin ("Retardion 11A8"). In the system 400, the raw water is introduced into the treatment chamber of the cell 400A via a conduit 411, the treated water from the treatment chamber of the cell 400B via a conduit 412, and the treated water from the treatment chamber of the cell 400B is conducted to the outside via a conduit 413. In the system 400, the pH of the raw water in the conduit 411 may be about 7, the pH of the treated water in the conduit 412 may be about 5, and the pH of the treated water in the conduit 413 may be about 7. This overall characteristic of the system 400 results from the circumstance that the inherent characteristic of the cell 400A is effective substantially to reduce the pH of the water undergoing demineralization, while the inherent characteristic of the cell 400B is effective substantially to increase the pH of the water undergoing demineralization. Accordingly, the treated water in the outlet conduit 413 is highly demineralized and has a pH in the neutral range.

Figure 5:
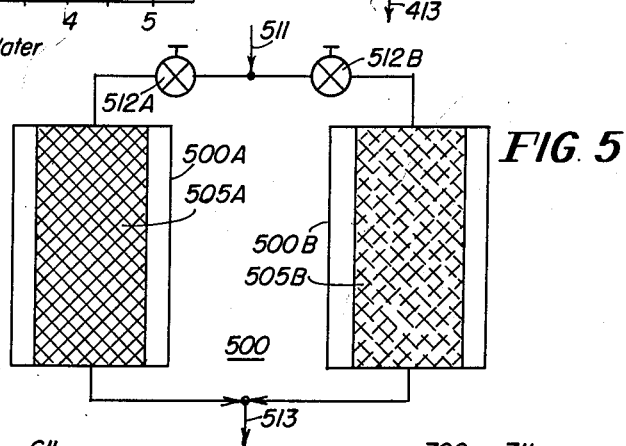
FIG. 5 is a schematic illustration of a modified form of a water demineralizing system incorporating the apparatus of FIG. 1.

Referring now to FIG. 5, there is diagrammatically illustrated another form of a water demineralizing system 500 that comprises two parallel related electrolytic cells 500A and 500B that may be of the fundamental construction of that disclosed in FIG. 1. In the arrangement, the treatment chamber of the cell 500A comprises a mixed bed 505A of cation exchange resin and anion exchange resin, while the treatment chamber of the cell 500B comprises a bed 505B of ion retardation resin. In the system 500, the raw water is introduced from a conduit 511 via two manually adjustable valves 512A and 512B respectively into the treatment chambers of the two cells 500A and 500B and from the two treatment chambers, the two portions of treated water are combined in an outlet conduit 513. In the system 500, the pH of the treated water from the treatment chamber of the cell 500A is decreased with respect to that of the raw water, while the pH of the treated water from the treatment chamber of the cell 500B is increased with respect to that of the raw water; whereby the combined treated water in the outlet conduit 512 may have a pH that is substantially the same as that of the raw water in the inlet conduit 511. In the system 500, it will be understood that the pH of the combined treated water in the conduit 513 may be selectively controlled by selectively proportioning the constituent portions thereof that are respectively treated in the cells 500A and 500B; which result may be achieved in an obvious manner by appropriate adjustment of the manual valves 512A and 512B.

Figure 6:
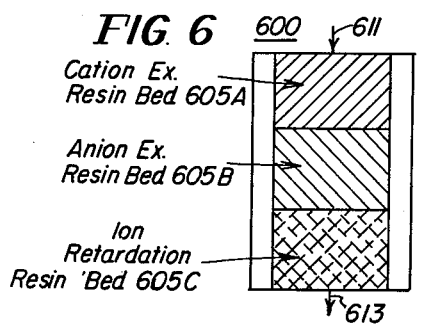
FIGS. 6 and 7 are schematic illustrations of corresponding modified forms of the apparatus of FIG. 1.

In FIG. 6, a modified form of the apparatus 600 is illustrated that may be of the fundamental construction of that of FIG. 1, except in this case, the bed disposed in the treatment compartment of the cell is of composite construction including an upper stratum 605A of cation exchange resin ("Amberlite IR–120"), an intermediate stratum 605B of anion exchange resin ("Amberlite IRA–410"), and a lower stratum 605C of ion retardation resin ("Retardion 11A8"). In the apparatus 600, the raw water is introduced via a conduit 611 into the upper portion of the treatment chamber of the cell and passes successively through the strata 605A, 605B and 605C and thence into the outlet conduit 613. In this arrangement, the three component elements of the bed are commonly arranged in the treatment chamber of the cell and it will be understood that the inherent characteristic of the stratum 605A is to decrease the pH of the treated solution, while the inherent characteristics of the strata 605B and 605C are to increase the pH of the treated solution. By proper proportionment of the strata 605A, 605B and 605C, a highly demineralized water having a pH in the neutral range may be readily obtained in the outlet conduit 613.

Figure 7:
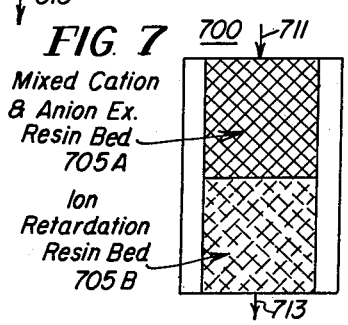

In FIG. 7, a modified form of the apparatus 700 is illustrated that may be of the fundamental construction of that of FIG. 1, except in this case, the bed disposed in the treatment chamber of the cell is of composite construction including an upper stratum 705A of mixed cation exchange resin and anion exchange resin, and a lower stratum 705B of ion retardation resin. In the apparatus 700, the raw water is introduced via a conduit 711 into the upper portion of the treatment chamber of the cell and passes successively through the strata 705A and 705B and thence into the outlet conduit 713. In this arrangement the two component elements of the bed are commonly arranged in the treatment chamber of the cell, and it will be understood that the inherent characteristic of the stratum 705A is to decrease the pH of the treated solution, while the inherent characteristic of the stratum 705B is to increase the pH of the treated solution. By proper proportionment of the strata 705A and 705B, a highly demineralized water having a pH in the neutral range may be readily obtained in the outlet conduit 713.

In conjunction with the treatment of raw water, it is noted that the dissolved mineral salts therein supply thereto such cations as $Ca^{++}$, $Mg^{++}$, $Fe^{++}$, $Na^+$, $Al^{+++}$, etc., and such anions as: $HCO_3^-$, $SO_4^{--}$, $Cl^-$, $CO_3^{--}$, etc. Moreover, water is considered to be highly mineralized when it contains a total dissolved solids content as high as 64 grains/gallon (1090 p.p.m.), while water is considered to be highly demineralized when it contains a total dissolved solids content not in excess of 3 grains/gallon (51 p.p.m.). Furthermore, in the industrial demineralizing of raw water, it is not normally the objective totally to deionize or to demineralize the same, but rather to deionize or demineralize the raw water sufficiently to reduce the total dissolved solids content thereof only appropriate to the intended utilization thereof.

In view of the foregoing, it is apparent that there has been provided an improved process of and apparatus for deionizing ionic solutions so as to obtain a treated solution of desired and controlled pH; and specifically, there has been provided an improved process of and apparatus for demineralizing raw water so as to obtain a highly demineralized treated water having a pH in the neutral range.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The process of demineralizing raw water containing dissolved metal salts, comprising passing the raw water over cation exchange resin and anion exchange resin and ion retardation resin characterized by both cation exchange and anion exchange, wherein said three resins named are provided with bodies of catholyte and anolyte

7 and are spaced therefrom by ion permeable membranes, maintaining across said three resins named an electrical potential causing displacement of sorbed cations and anions therefrom respectively into said bodies of catholyte and anolyte to effect regeneration of said three resins named, whereby the pH of the water contacting said cation exchange resin is decreased and the pH of the water contacting said anion exchange resin is increased and the pH of the water contacting said ion retardation resin is increased, wherein the decrease of the pH of the water contacting said cation exchange resin substantially matches the sum of the two increases in the pH of the water contacting said anion exchange resin and said ion retardation resin, so that the pH changes of the water in contacting said three resins named substantially balance each other in order that the overall pH of the resulting treated water is not materially different from that of the raw water.

2. The process set forth in claim 1, wherein the raw water is passed sequentially through said cation exchange resin and said anion exchange resin and said ion retardation resin in the order named.

3. The process set forth in claim 1, wherein the raw water is passed simultaneously through said cation exchange resin and said anion exchange resin and is then passed through said ion retardation resin.

4. The process set forth in claim 1, wherein the raw water is first divided into two portions, the first portion is passed through said cation exchange resin and said anion exchange resin and the second portion is passed through said ion retardation resin, and then the first and second portions of treated water are combined.

5. The process of demineralizing raw water containing dissolved metal salts, comprising passing the raw water through a mixed bed of cation exchange resin and anion exchange resin, wherein said mixed resin bed is contained in a first inner compartment of a first electrolytic cell and separated from first bodies of catholyte and anolyte by first ion permeable membranes, maintaining across said mixed resin bed an electrical potential causing displacement of sorbed cations and anions therefrom respectively into said first bodies of catholyte and anolyte to effect regeneration of said first resin bed, whereby the pH of the water undergoing treatment in said first electrolytic cell is somewhat decreased, passing the treated water from said first electrolytic cell through a bed of ion retardation resin characterized by both cation exchange and anion exchange, wherein said ion retardation resin bed is contained in a second inner compartment of a second electrolytic cell and separated from second bodies of catholyte and anolyte by second ion permeable membranes, and maintaining across said ion retardation resin bed an electrical potential causing displacement of sorbed cations and anions therefrom respectively into said second bodies of catholyte and anolyte to effect regeneration of said ion retardation resin bed, whereby the pH of the water undergoing treatment in said second electrolytic cell is somewhat increased, the pH changes of the water in said first and second electrolytic cells substantially matching each other so that the overall pH of the resulting treated water is not materially different from that of the raw water.

6. The process of demineralizing raw water containing dissolved metal salts, comprising passing a first portion of the raw water through a mixed bed of cation exchange resin and anion exchange resin, wherein said mixed resin bed is contained in a first inner compartment of a first electrolytic cell and separated from first bodies of catholyte and anolyte by first ion permeable membranes, maintaining across said mixed resin bed an electrical potential causing displacement of sorbed cations and anions therefrom respectively into said first bodies of catholye and anolyte to effect regeneration of said mixed resin bed, whereby the pH of the water undergoing treatment in said first electrolytic cell is somewhat decreased, passing a second portion of the raw water through a bed of ion retardation resin characterized by both cation exchange and anion exchange, wherein said ion retardation resin bed is contained in a second inner compartment of a second electrolytic cell and separated from second bodies of catholyte and anolyte by second ion permeable membranes, maintaining across said ion retardation resin bed an electrical potential causing displacement of sorbed cations and anions therefrom respectively into said second bodies of catholyte and anolyte to effect regeneration of said ion retardation resin bed, whereby the pH of the water undergoing treatment in said second electrolytic cell is somewhat increased, and combining said two separately treated portions of water to produce a resulting treated water having a pH that is not materially different from that of the raw water.

7. The process of deionizing an ionic liquid, comprising passing the ionic liquid first through a bed of cation exchange resin and next through a bed of anion exchange resin and then through a bed of ion retardation resin characterized by both cation exchange and anion exchange, wherein said three resin beds named are commonly contained in an inner compartment of an electrolytic cell and separated from bodies of catholyte and anolyte by ion permeable membranes, and maintaining across said three resin beds named an electrical potential causing displacement of sorbed cations and anions therefrom respectively into said bodies of catholyte and anolyte to effect regeneration of said three resin beds named.

8. The process of deionizing an ionic liquid, comprising passing the ionic liquid first through a mixed bed of cation exchange resin and anion exchange resin and then through a bed of ion retardation resin characterized by both cation exchange and anion exchange, wherein said two resin beds named are commonly contained in an inner compartment of an electrolytic cell and separated from bodies of catholyte and anolyte by ion permeable membranes, and maintaining across said two resin beds named an electrical potential causing displacement of sorbed cations and anions therefrom respectively into said bodies of catholyte and anolyte to effect regeneration of said two resin beds named.

9. The process of deionizing an ionic liquid, comprising passing the ionic liquid through a composite bed of cation exchange resin and anion exchange resin and ion retardation resin characterized by both cation exchange and anion exchange, wherein said composite resin bed is contained in an inner compartment of an electrolytic cell and separated from bodies of catholyte and anolyte by ion permeable membranes, and maintaining across said composite resin bed an electrical potential causing displacement of sorbed cations and anions therefrom respectively into said bodies of catholyte and anolyte to effect regeneration of said composite resin bed.

10. In apparatus for demineralizing raw water containing dissolved metal salts, first structure containing cation exchange resin and anion exchange resin and ion retardation resin characterized by both cation exchange and anion exchange, second structure providing said three resins named with bodies of catholyte and anolyte, ion permeable membranes separating said three resins named from said bodies of catholyte and anolyte, means for passing the raw water over said three resins named and also into contact with said membranes, and means for conducting a direct electric current between said bodies of anolyte and catholyte and through said three resins named to cause displacement of sorbed cations and anions therefrom respectively into said bodies of catholyte and anolyte to effect regeneration of said three resins named, whereby the pH of the water contacting said cation exchange resin is decreased and the pH of the water contacting said anion exchange resin is increased and the pH of the water contacting said anion retardation resin is increased, wherein the decrease of the pH of the water contacting said cation exchange resin substantially matches the sum of the two increases in the pH of the water contacting said anion exchange resin and said ion retardation resin, so that the pH changes of the water in contacting said three resins named substantially balances each other in order that the overall pH of the resulting treated water is not materially different from that of the raw water.

11. Apparatus for demineralizing raw water containing dissolved metal salts, comprising first structure defining a first treatment chamber and a first catholyte chamber and a first anolyte chamber and provided with a first ion permeable catholyte membrane as a common wall between said first treatment chamber and said first catholyte chamber and a first ion permeable anolyte membrane as a common wall between said first treatment chamber and said first anolyte chamber, a mixed bed of cation exchange resin and anion exchange resin arranged in said first treatment chamber, means for passing the raw water through said first treatment chamber and into contact with said mixed resin bed and also into contact with said first catholyte membrane and said first anolyte membrane, a first body of catholyte arranged in said first catholyte chamber in contact with said first catholyte membrane, a first body of anolyte arranged in said first anolyte chamber in contact with said first anolyte membrane, means for conducting a direct electric current from said first anolyte to said first catholyte and through said mixed resin bed in order to effect regeneration thereof, second structure defining a second treatment chamber and a second catholyte chamber and a second anolyte chamber and provided with a second ion permeable catholyte membrane as a common wall between said second treatment chamber and said second catholyte chamber and a second ion permeable anolyte membrane as a common wall between said second treatment chamber and said second anolyte chamber, a bed of ion retardation resin characterized by both cation exchange and anion exchange arranged in said second treatment chamber, means for passing the treated water from said first treatment chamber through said second treatment chamber and into contact with said ion retardation resin bed and also into contact with said second catholyte membrane and said second anolyte membrane, a second body of catholyte arranged in said second catholyte chamber in contact with said second catholyte membrane, a second body of anolyte arranged in said second anolyte chamber in contact with said second anolyte membrane, and means for conducting a direct current from said second anolyte to said second catholyte and through said ion retardation resin bed in order to effect regeneration thereof.

12. Apparatus for demineralizing raw water containing dissolved metal salts, comprising first structure defining a first treatment chamber and a first catholyte chamber and a first anolyte chamber and provided with a first ion permeable catholyte membrane as a common wall between said first treatment chamber and said first catholyte chamber and a first ion permeable analyte membrane as a common wall between said first treatment chamber and said first anolyte chamber, a mixed bed of cation exchange resin and anion exchange resin arranged in said first treatment chamber, means for passing a first portion of the raw water through said first treatment chamber and into contact with said mixed resin bed and also into contact with said first catholyte membrane and said first anolyte membrane, a first body of catholyte arranged in said first catholyte chamber in contact with said first catholyte membrane, a first body of analyte arranged in said first analyte chamber in contact with said first anolyte membrane, means for conducting a direct electric current from said first analyte to said first catholyte and through said mixed resin bed in order to effect regeneration thereof, second structure defining a second treatment chamber and a second catholyte chamber and a second anolyte chamber and provided with a second ion permeable catholyte membrane as a common wall between said second treatment chamber and said second catholyte chamber and a second ion permeable anolyte membrane as a common wall between said second treatment chamber and said second anolyte chamber, a bed of ion retardation resin characterized by both cation exchange and anion exchange arranged in said second treatment chamber, means for passing a second portion of the raw water through said second treatment chamber and into contact with said ion retardation resin bed and also into contact with said second catholyte membrane and said second anolyte membrane, a second body of catholyte arranged in said second catholyte chamber in contact with said second catholyte membrane, a second body of anolyte arranged in said second anolyte chamber in contact with said second anolyte membrane, means for conducting a direct current from said second anolyte to said second catholyte and through said ion retardation resin bed in order to effect regeneration thereof, and means for combining said two separately treated portions of water from said first and second treatment chambers.

13. In apparatus for deionizing an ionic liquid, structure defining first and second and third chambers and provided with a first ion permeable membrane as a common wall between said first and second chambers and a second ion permeable membrane as a common wall between said first and third chambers, a porous bed of cation exchange resin, a porous bed of anion exchange resin, a porous bed of ion retardation resin characterized by both cation exchange and anion exchange, said three resin beds named being commonly arranged in said first chamber with said anion exchange resin bed disposed between said cation exchange resin bed and said ion retardation resin bed, means for passing the ionic liquid through said first chamber and into contact with said three resin beds successively in the order named and also into contact with said first and second membranes, a body of catholyte arranged in said second chamber in contact with said first membrane, a body of anolyte arranged in said third chamber in contact with said second membrane, and means for conducting a direct electric current from said anolyte to said catholyte and through said three resin beds named in order to effect regeneration thereof.

14. In apparatus for deionizing an ionic liquid, structure defining first and second and third chambers and provided with a first ion permeable membrane as a common wall between said first and second chambers and a second ion permeable membrane as a common wall between said first and third chambers, a porous mixed bed of cation exchange resin and anion exchange resin, a porous bed of ion retardation resin characterized by both cation exchange and anion exchange, said two resin beds named being commonly arranged in said first chamber, means for passing the ionic liquid through said first chamber and into contact with said two resin beds successively in the order named and also into contact with said first and second membranes, a body of catholyte arranged in said second chamber in contact with said first membrane, a body of anolyte arranged in said third chamber in contact with said second membrane, and means for conducting a direct electric current from said anolyte to said catholyte and through said two resin beds named in order to effect regeneration thereof.

15. In apparatus for deionizing an ionic liquid, structure defining first and second and third chambers and provided with a first ion permeable membrane as a common wall between said first and second chambers and a second ion permeable membrane as a common wall between said first and third chambers, a porous composite bed of cation exchange resin and anion exchange resin and ion retardation resin characterized by both cation exchange and anion exchange arranged in said first chamber, means for passing the ionic liquid through said first chamber and into contact with said composite resin bed and also into contact with said first and second membranes, a body of catholyte arranged in said second chamber in contact with said first membrane, a body of anolyte arranged in said third chamber in contact with said second membrane, and means for conducting a direct electric current from said anolyte to said catholyte and through said composite resin bed in order to effect regeneration thereof.

References Cited in the file of this patent

UNITED STATES PATENTS

| | | |
|---|---|---|
| 2,788,319 | Pearson | Apr. 9, 1957 |
| 2,815,320 | Kollsman | Dec. 3, 1957 |
| 2,906,684 | Stoddard | Sept. 29, 1959 |
| 2,912,372 | Stoddard | Nov. 10, 1959 |
| 2,938,849 | Stoddard | May 31, 1960 |
| 2,980,598 | Stoddard | Apr. 18, 1961 |

FOREIGN PATENTS

| | | |
|---|---|---|
| 675,253 | Great Britain | July 9, 1952 |
| 702,316 | Great Britain | Jan. 13, 1954 |

OTHER REFERENCES

Hatch et al.: Industry and Eng. Chem., volume 49, No. 11; November 1957, pages 1812–19.